United States Patent
Zhou et al.

(10) Patent No.: US 11,349,163 B2
(45) Date of Patent: May 31, 2022

(54) BATTERY ELECTRODE, METHOD FOR PRODUCING BATTERY ELECTRODE, AND BATTERY

(71) Applicant: Huawei Technologies Co., Ltd., Shenzhen (CN)

(72) Inventors: Huihui Zhou, Shenzhen (CN); Yangxing Li, Shenzhen (CN); Chenguang Liu, Shenzhen (CN); Guocheng Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 16/582,557

(22) Filed: Sep. 25, 2019

(65) Prior Publication Data

US 2020/0020996 A1    Jan. 16, 2020

Related U.S. Application Data

(63) Continuation of application No. PCT/CN2018/079820, filed on Mar. 21, 2018.

(30) Foreign Application Priority Data

Mar. 25, 2017    (CN) .................. 201710185230.3

(51) Int. Cl.
*H01M 4/133*     (2010.01)
*H01M 4/1393*    (2010.01)
(Continued)

(52) U.S. Cl.
CPC ......... *H01M 10/654* (2015.04); *H01M 4/133* (2013.01); *H01M 4/1393* (2013.01); *H01M 4/628* (2013.01); *H01M 10/4235* (2013.01)

(58) Field of Classification Search
CPC .............. H01M 10/654; H01M 4/628; H01M 10/4235; H01M 4/1393; H01M 4/133;
(Continued)

(56) References Cited

U.S. PATENT DOCUMENTS

2009/0325071 A1    12/2009    Verbrugge et al.
2012/0094166 A1    4/2012     Lee et al.
(Continued)

FOREIGN PATENT DOCUMENTS

CN    102412065 B    11/2013
CN    102208598 B    3/2014
(Continued)

OTHER PUBLICATIONS

Foreign Communication From A Counterpad Application, European Application No. 18776082.2, Extended European Search Report dated Feb. 20, 2020, 7 pages.
(Continued)

*Primary Examiner* — James Lee
(74) *Attorney, Agent, or Firm* — Conley Rose, P.C.

(57) ABSTRACT

An electrode material layer includes an electrode active material and graphene of a sheet-like structure, a surface of the graphene is modified with magnetic response nanodots, and in the graphene, more than 50% of the graphene is arranged at an angle of 45° to 90° with respect to a surface, of the current collector, on which the electrode material layer is disposed, to form a heat conduction path having a specific orientation.

20 Claims, 3 Drawing Sheets

(51) Int. Cl.
*H01M 10/654* (2014.01)
*H01M 4/62* (2006.01)
*H01M 10/42* (2006.01)

(58) Field of Classification Search
CPC ...... H01M 4/583; H01M 4/625; H01M 4/663; H01M 4/667
See application file for complete search history.

(56) References Cited

U.S. PATENT DOCUMENTS

| | | |
|---|---|---|
| 2012/0177842 A1 | 7/2012 | Mikami et al. |
| 2012/0192931 A1 | 8/2012 | Jeon et al. |
| 2014/0017550 A1 | 1/2014 | Wang et al. |
| 2014/0017552 A1 | 1/2014 | Wang et al. |
| 2014/0017563 A1 | 1/2014 | Wang et al. |
| 2014/0315083 A1 | 10/2014 | Liu et al. |
| 2017/0200935 A1 | 7/2017 | Hong et al. |
| 2017/0222162 A1* | 8/2017 | Lee .................. H01L 51/0034 |

FOREIGN PATENT DOCUMENTS

| | | |
|---|---|---|
| CN | 103682368 A | 3/2014 |
| CN | 102498610 B | 9/2014 |
| CN | 104119595 A | 10/2014 |
| CN | 102482076 B | 12/2014 |
| CN | 104347881 A | 2/2015 |
| CN | 104600320 A | 5/2015 |
| CN | 103384007 B | 11/2015 |
| CN | 105210214 A | 12/2015 |
| CN | 103545529 B | 1/2016 |
| CN | 105355847 A | 2/2016 |
| CN | 103545528 B | 3/2016 |
| CN | 105449223 A | 3/2016 |
| CN | 103545530 B | 4/2016 |
| CN | 105542728 A | 5/2016 |
| CN | 105637696 A | 6/2016 |
| CN | 105762366 A | 7/2016 |
| CN | 105826512 A | 8/2016 |
| CN | 105826571 A | 8/2016 |
| CN | 105906844 A | 8/2016 |
| EP | 2793300 A1 | 10/2014 |
| EP | 2996189 A1 | 3/2016 |
| WO | 2016010294 A1 | 1/2016 |
| WO | 2016025532 A1 | 2/2016 |

OTHER PUBLICATIONS

Billaud, J., et al. "Magnetically aligned graphite electrodes for high-rate performance Li-ion batteries," Nature Energy, Published: Jul. 4, 2016, 7 pages.
Machine Translation and Abstract of Chinese Publication No. CN102412065, Nov. 6, 2013, 10 pages.
Machine Translation and Abstract of Chinese Publication No. CN103384007, Nov. 18, 2015, 12 pages.
Machine Translation and Abstract of Chinese Publication No. CN103682368, Mar. 26, 2014, 20 pages.
Machine Translation and Abstract of Chinese Publication No. CN104119595, Oct. 29, 2014, 17 pages.
Machine Translation and Abstract of Chinese Publication No. CN104347881, Feb. 11, 2015, 15 pages.
Machine Translation and Abstract of Chinese Publication No. CN104600320, May 6, 2015, 7 pages.
Machine Translation and Abstract of Chinese Publication No. CN105355847, Feb. 24, 2016, 12 pages.
Machine Translation and Abstract of Chinese Publication No. CN105449223, Mar. 30, 2016, 8 pages.
Machine Translation and Abstract of Chinese Publication No. CN105542728, May 4, 2016, 8 pages.
Machine Translation and Abstract of Chinese Publication No. CN105762366, Jul. 13, 2016, 10 pages.
Machine Translation and Abstract of Chinese Publication No. CN105826512, Aug. 3, 2016, 12 pages.
Machine Translation and Abstract of Chinese Publication No. CN105826571, Aug. 3, 2016, 8 pages.
Machine Translation and Abstract of Chinese Publication No. CN105906844, Aug. 31, 2016, 16 pages.
Foreign Communication From A Counterpart Application, Chinese Application No. 201710185230.3, Chinese Office Action dated Jun. 4, 2019, 10 pages.
Foreign Communication From A Counterpart Application, PCT Application No. PCT/CN2018/079820, English Translation of International Search Report dated May 31, 2018, 2 pages.
Foreign Communication From A Counterpart Application, PCT Application No. PCT/CN2018/079820, English Translation of Written Opinion dated May 31, 2018, 4 pages.

* cited by examiner

Heat flow path

BATTERY ELECTRODE, METHOD FOR PRODUCING BATTERY ELECTRODE, AND BATTERY

CROSS-REFERENCE TO RELATED APPLICATIONS

This application is a continuation of International Patent Application No. PCT/CN2018/079820 filed on Mar. 21, 2018, which claims priority to Chinese Patent Application No. 201710185230.3 filed on Mar. 25, 2017. The disclosures of the aforementioned applications are hereby incorporated by reference in their entireties.

TECHNICAL FIELD

The present application relates to the field of energy storage device technologies, and in particular, to a battery electrode, a method for producing a battery electrode, and a battery.

BACKGROUND

Secondary batteries are widely used in consumer electronics and communications fields. Fast charging and high energy are major requirements for development of next-generation energy storage technologies. However, as a charging speed of a battery increases and energy density continuously increases, a large amount of heat is generated in a working process of the battery. Consequently, a temperature inside an electrochemical cell sharply increases, an electrode material structure changes, a battery capacity rapidly decreases, and there are security risks that cannot be ignored.

Heat generation and thermal runaway of a battery are mainly affected by an ambient temperature, a heat dissipation manner, and internal factors such as a charging/discharging rate, internal resistance, a depth of discharge (DOD), a current state of charge (SOC), and a capacity. A temperature inside a battery is extremely high mainly because materials inside an electrode are agglomerated, resistance is suddenly increased, and more heat is generated, but an orderly interconnected heat conduction network is not available for timely heat conduction. FIG. 1 is a schematic diagram of heat distribution inside a conventional electrode. Therefore, constructing an effective heat dissipation electrode is an effective solution for improving high-temperature performance of a battery.

SUMMARY

In view of this, embodiments of the present application provide a battery electrode, and a fast heat conduction path having a specific orientation exists inside an electrochemical cell material of the battery electrode such that heat inside an electrochemical cell can be effectively transmitted to an ambient environment to resolve a problem that high-temperature performance of a battery is poor because heat generated inside a single electrochemical cell cannot be conducted to an environment in a timely manner.

A first aspect of the embodiments of the present application provides a battery electrode, including a current collector and an electrode material layer disposed on the current collector, where the electrode material layer includes an electrode active material and graphene of a sheet-like structure, a surface of the graphene is modified with magnetic response nanodots, and in the graphene, more than 50% of the graphene is arranged at an angle of 45° to 90° with respect to a surface, of the current collector, on which the electrode material layer is disposed, to form a heat conduction path having a specific orientation.

The magnetic response nanodots are distributed at intervals on the surface of the graphene of the sheet-like structure such that the graphene of the sheet-like structure is arranged, under an action of a magnetic field, in a same direction with respect to the surface, of the current collector, on which the electrode material layer is disposed.

70% to 100% of the graphene is arranged at the angle of 45° to 90° with respect to the current collector.

In the electrode material layer, the graphene is all arranged at an angle of 80° to 90° with respect to the current collector.

The graphene is single-layer or multilayer graphene, and a thickness of the graphene is from 0.3 nanometers (nm) to 50 nm.

A mass content of the graphene in the electrode material layer is from 0.1% to 20%.

A heat conduction modification layer is disposed on the surface of the current collector, the electrode material layer is disposed on a surface of the heat conduction modification layer, and the heat conduction modification layer and the graphene in the electrode material layer form an interconnected heat conduction network.

A material of the heat conduction modification layer includes at least one of a carbon material and a heat conduction metal material. The heat conduction metal material includes gold, silver, copper, aluminum, and the like.

The carbon material includes one or more of carbon black, acetylene black, crystalline graphene, reduced graphene, and graphene including a doping element, and the doping element includes one or more of nitrogen, phosphorus, sulfur, boron, fluorine, and chlorine.

The carbon material of the heat conduction modification layer and the graphene in the electrode material layer are tightly bonded together through π-π interaction such that the graphene and the heat conduction modification layer form an interconnected three-dimensional heat conduction network.

A thickness of the heat conduction modification layer is from 0.5 nm to 500 nm.

The heat conduction modification layer on the current collector is produced using a physical coating method, a chemical vapor deposition technique, an evaporation deposition method, or a sputtering method.

The current collector includes metal foil or alloy foil, the metal foil includes copper, titanium, aluminum, platinum, iridium, ruthenium, nickel, tungsten, tantalum, gold, or silver foil, and the alloy foil includes stainless steel or an alloy including at least one of the following elements copper, titanium, aluminum, platinum, iridium, ruthenium, nickel, tungsten, tantalum, gold, and silver. The metal foil may further include a doping element, and the doping element includes one or more of platinum, ruthenium, iron, cobalt, gold, copper, zinc, aluminum, magnesium, palladium, rhodium, silver, and tungsten.

A secondary structure is disposed on the surface of the current collector, and a material of the heat conduction modification layer is partially deposited on a surface of the secondary structure. The secondary structure includes a vertical array protrusion.

A height of the protrusion is from 1% to 50% of a thickness of the current collector.

The magnetic response nanodot includes one or more of an oxide, an alloy, and a composite material including a magnetic element, and the magnetic element includes at least one of iron, cobalt, and nickel. The oxide, the alloy, and the composite material including at least one of iron, cobalt, and nickel are ferromagnetic materials.

The magnetic response nanodot further includes another doping element, and the doping element includes one or more of platinum, ruthenium, iron, cobalt, gold, copper, zinc, aluminum, magnesium, palladium, rhodium, silver, and tungsten.

A particle size of the magnetic response nanodot is less than or equal to 50 nm.

The electrode active material is a material that can store energy by deionizing ions, and a particle size of the electrode active material is from 3 nm to 30 micrometers ($\mu$m). The ions include one of a lithium ion, a sodium ion, a potassium ion, a magnesium ion, and an aluminum ion.

A thickness of the electrode material layer is from 5 $\mu$m to 150 $\mu$m.

According to the battery electrode provided in the first aspect of the embodiments of the present application, the graphene in the electrode material layer can be arranged in order under adjustment of the applied magnetic field because the graphene has a magnetic response function to construct a heat conduction path for fast conducting heat inside an electrochemical cell such that heat inside a battery can be effectively conducted from a center to an ambient environment, and high-temperature performance of the battery is improved. In addition, the graphene is introduced to make the electrode material more evenly dispersed, thereby avoiding agglomeration of electrode materials, reducing internal resistance, reducing heat generation of the battery, and further improving the high-temperature performance of the battery.

Correspondingly, a second aspect of the embodiments of the present application provides a method for producing a battery electrode, including modifying a surface of graphene of a sheet-like structure with magnetic response nanodots to obtain graphene whose surface is modified with the magnetic response nanodots, and mixing the graphene whose surface is modified with the magnetic response nanodots with an electrode active material and a bonding agent to obtain slurry, coating the slurry on a current collector under an action of an applied magnetic field, and drying the slurry under an action of the applied magnetic field such that the graphene is arranged to obtain an electrode material layer, to be specific, obtain a battery electrode, where in the graphene, more than 50% of the graphene is arranged at an angle of 45° to 90° with respect to a surface, of the current collector, on which the electrode material layer is disposed, to form a heat conduction path having a specific orientation.

The magnetic field is applied in the process of coating and drying the slurry, and the magnetic field may be from a fixed magnet or may be a rotating magnetic field. In an ideal state, when a direction of the applied magnetic field is perpendicular to the surface, of the current collector, on which the electrode material layer is located, in the coating and drying process, because the graphene that is suspended in the slurry and whose surface is modified with the magnetic response nanodots has ferromagnetism, the graphene tends to be arranged in a direction the same as that of the applied magnetic field, to be specific, the graphene is finally arranged at an angle perpendicular to the surface of the current collector. However, in an actual process, in addition to being affected by a magnetic field force, the graphene is further affected by a force such as gravity of the graphene or a force between particles. Therefore, the graphene is finally arranged based on a combined effect of these forces. Therefore, the direction of the applied magnetic field in the actual process needs to be adjusted based on an actual situation to obtain a result that more than 50% of the graphene is arranged at the angle of 45° to 90° with respect to the current collector.

In the embodiments of the present application, the graphene whose surface is modified with the magnetic response nanodots is produced using a microwave synthesis method, a hydrothermal method, a magnetron sputtering method, an evaporation deposition method, or a chemical vapor deposition technique.

The production method in the embodiments of the present application further includes first producing a heat conduction modification layer on the current collector using a physical coating method, a chemical vapor deposition technique, an evaporation deposition method, or a sputtering method, then coating the slurry on a surface of the heat conduction modification layer, and drying the slurry under an action of the magnetic field such that the graphene is arranged to obtain the electrode material layer.

In addition, the embodiments of the present application further provide a battery, and the battery includes the battery electrode according to the first aspect of the embodiments of the present application. The battery electrode may be a positive electrode or a negative electrode. The battery includes a metal lithium battery, a lithium-ion battery, a sodium-ion battery, a magnesium-ion battery, an aluminum-ion battery, an air battery, or a fuel cell.

BRIEF DESCRIPTION OF DRAWINGS

To describe the technical solutions in some of the embodiments of the present application more clearly, the following briefly describes the accompanying drawings describing some of the embodiments of the present application.

DESCRIPTION OF EMBODIMENTS

Figure 1:
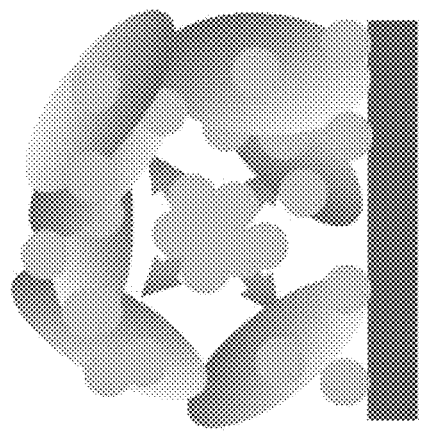
FIG. 1 is a schematic diagram of heat distribution inside an electrode.
Figure 1:
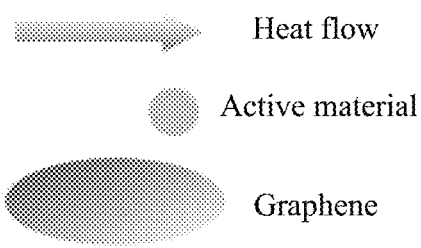

The following describes the embodiments of the present application with reference to the accompanying drawings in the embodiments of the present application.

To resolve a problem that heat inside a single electrochemical cell cannot be effectively conducted to a periphery of a battery, an embodiment of the present application provides a battery electrode, including a current collector and an electrode material layer disposed on the current collector. The electrode material layer includes an electrode active material and graphene of a sheet-like structure, a surface of the graphene is modified with magnetic response nanodots, and in the graphene, more than 50% of the graphene is arranged at an angle of 45° to 90° with respect to a surface, of the current collector, on which the electrode material layer is disposed to form a heat conduction path having a specific orientation.

In an implementation of the present application, the magnetic response nanodot is a nanoparticle that can sense a magnetic field and that can generate a magnetic response.

The magnetic response nanodots are distributed at intervals on the surface of the graphene of the sheet-like structure such that the graphene of the sheet-like structure is arranged, under an action of a magnetic field, in a same direction with respect to the surface, of the current collector, on which the electrode material layer is disposed.

In an implementation of the present application, the surface of the graphene in the electrode material layer is modified with the magnetic response nanodots, and therefore the graphene is arranged in order in the applied magnetic field, and a directional, parallel, and fast heat conduction path from the inside to the outside is formed inside an electrochemical cell to improve heat dissipation performance of a battery. This resolves a problem that heat generated inside an electrochemical cell material cannot be conducted from a center of the electrochemical cell material to an ambient environment in a timely manner. In addition, the graphene is introduced to make the graphene and the active material more evenly dispersed, thereby avoiding agglomeration of particles of the active material, and making heat generation distribution more even. Optionally, 70% to 100% of the graphene is arranged at the angle of 45° to 90° with respect to the current collector. Further, 80% to 95% of the graphene may be arranged at the angle of 45° to 90° with respect to the current collector.

Optionally, in the electrode material layer, the graphene is all arranged at an angle of 80° to 90° with respect to the current collector. In this way, a heat conduction framework inside an electrochemical cell material including the graphene has a shortest heat conduction path such that heat in a center of the electrochemical cell can be transmitted to the current collector in a quickest manner.

In an implementation of the present application, the graphene may be single-layer graphene or multilayer graphene, and a thickness of the graphene may be from 0.3 nm to 50 nm. Further, the thickness may be from 2 nm to 30 nm. An appropriate graphene thickness can ensure a better orderly arrangement of the graphene in the electrode material layer.

In an implementation of the present application, a mass content of the graphene in the electrode material layer is from 0.1% to 20%, and further may be from 0.5% to 2%, from 1% to 5%, from 5% to 10%, or from 10% to 15%. The graphene has good conductivity and may be used as a conductive agent.

In an implementation of the present application, a heat conduction modification layer is further disposed on the surface of the current collector, the electrode material layer is disposed on a surface of the heat conduction modification layer, and the heat conduction modification layer and the graphene in the electrode material layer form an interconnected heat conduction network. The heat conduction modification layer is disposed such that a complete and coherent heat conduction path is constructed between the electrode material layer and the current collector, and heat inside the electrochemical cell can be transmitted to the current collector faster and is further transmitted to an ambient environment of the battery, thereby improving a heat dissipation characteristic of the battery. The interconnected heat conduction network including the heat conduction modification layer and the graphene in the electrode material layer has good conductivity, and may provide a fast channel for an electron. Therefore, internal resistance of the battery can be reduced while electrochemical performance of the battery is improved, and heat generation is further reduced.

The heat conduction modification layer and the graphene in the electrode material layer form an interconnected three-dimensional heat conduction network through physical or chemical interaction.

In an implementation of the present application, a material of the heat conduction modification layer includes at least one of a carbon material and a heat conduction metal material. The heat conduction metal material may be a material such as gold, silver, copper, or aluminum.

In an implementation of the present application, the carbon material includes one or more of carbon black, acetylene black, crystalline graphene, reduced graphene, and graphene including a doping element, and the doping element includes one or more of nitrogen, phosphorus, sulfur, boron, fluorine, and chlorine. The doping can further improve electric conductivity of the graphene, reduce internal resistance of the battery, and reduce heat generation.

In an implementation of the present application, the carbon material of the heat conduction modification layer and the graphene in the electrode material layer are tightly bonded together through π-π interaction such that the graphene and the heat conduction modification layer form an interconnected three-dimensional heat conduction network. The heat conduction metal material and the graphene in the electrode material layer form the interconnected three-dimensional heat conduction network through physical contact.

In an implementation of the present application, a thickness of the heat conduction modification layer is from 0.5 nm to 500 nm. Further, the thickness of the heat conduction modification layer is from 10 nm to 300 nm or from 30 nm to 150 nm. A specific thickness can ensure mechanical strength of the heat conduction modification layer, maintain an arrangement shape of the heat conduction modification layer on the surface of the current collector, and improve effective contact between the heat conduction modification layer and the graphene in the electrode material layer.

In an implementation of the present application, the heat conduction modification layer on the current collector is produced using a physical coating method, a chemical vapor deposition technique, an evaporation deposition method, or a sputtering method.

In an implementation of the present application, the current collector includes metal foil or alloy foil, the metal foil includes copper, titanium, aluminum, platinum, iridium, ruthenium, nickel, tungsten, tantalum, gold, or silver foil, and the alloy foil includes stainless steel, or an alloy including at least one of copper, titanium, aluminum, platinum, iridium, ruthenium, nickel, tungsten, tantalum, gold, and silver. The metal foil may further include a doping element, and the doping element includes one or more of platinum, ruthenium, iron, cobalt, gold, copper, zinc, aluminum, magnesium, palladium, rhodium, silver, and tungsten.

In an implementation of the present application, a secondary structure is disposed on the surface of the current collector, and a material of the heat conduction modification layer is partially deposited on a surface of the secondary structure. The secondary structure may be a vertical array protrusion, such as a linear protrusion or a column protrusion. A material of the secondary structure may be an oxide of a current collector substrate, for example, a secondary structure of a copper oxide material disposed on a surface of a copper foil current collector. A height of the protrusion may be from 1% to 50% of a thickness of the current collector, and further, may be from 10% to 30% or from 20% to 40% of the thickness of the current collector. The secondary structure on the current collector makes the material of the heat conduction modification layer be partially inserted in the electrode material layer such that effective contact between the heat conduction modification layer and the graphene in the electrode material layer can be improved, interconnection is enhanced, and a heat dissipation effect is improved.

In an implementation of the present application, the magnetic response nanodot includes one or more of an oxide, an alloy, and a composite material including a magnetic element, and the magnetic element includes at least one of iron, cobalt, and nickel. In this implementation of the present application, the magnetic response nanodot further includes another doping element, and the doping element includes one or more of platinum, ruthenium, iron, cobalt, gold, copper, zinc, aluminum, magnesium, palladium, rhodium, silver, and tungsten. Optionally, a particle size of the magnetic response nanodot is less than or equal to 50 nm. Further, the particle size of the magnetic response nanodot is from 5 nm to 20 nm. An appropriate particle size can ensure that the magnetic response nanodot can be firmly bonded to a graphene sheet layer, and is not easily detached. This helps to achieve an orientational arrangement effect of the graphene. In addition, because the magnetic response nanodot does not have an energy storage function, the appropriate particle size is beneficial to ensuring battery performance.

In an implementation of the present application, mass of the magnetic response nanodots is less than 5% of total mass of the entire electrode material layer. Further, the mass of the magnetic response nanodots is less than 2% of the total mass of the entire electrode material layer. An appropriate mass content can not only ensure an orientational arrangement effect of graphene, but also help to ensure battery performance.

In an implementation of the present application, the battery electrode may be a positive electrode, or may be a negative electrode. The electrode active material is a material that can store energy by deionizing ions, and a particle size of the electrode active material is from 3 nm to 30 μm. Further, the particle size of the electrode active material is from 50 nm to 5 μm. The ions include one of a lithium ion, a sodium ion, a potassium ion, a magnesium ion, and an aluminum ion. The electrode active material includes but is not limited to a metal, an inorganic non-metal, an oxide, a nitride, a boride, a sulfide, a chloride, or a composite material of a plurality of energy storage materials. In an embodiment, the electrode active material may be lithium, potassium, magnesium, sulfur, phosphorus, silicon, a lithium cobalt oxide, lithium iron phosphate, a layered gradient compound, lithium carbonate ($Li_2CO_3$), lithium silicate ($Li_4SiO_4$), lithium fluoride (LiF), lithium phosphite ($Li_3PO_3$), titanium dioxide ($TiO_2$), lithium metatitanate ($Li_2TiO_3$), lithium titanate ($Li_4Ti_5O_{12}$), silicon dioxide ($SiO_2$), Tin dioxide ($SnO_2$), nickel sulfide (NiS), copper monosulfide (CuS), ferrous sulfide (FeS), manganese sulfide (MnS), silver sulfide ($Ag_2S$), or titanium disulfide ($TiS_2$).

In an implementation of the present application, the electrode material layer further includes a bonding agent. The bonding agent may be polyvinylidene fluoride (PVDF), polyvinyl alcohol (PVA), polytetrafluoroethylene (PTFE), carboxymethyl cellulose (CMC), styrene butadiene rubber (SBR), sodium alginate, or the like. In this implementation of the present application, the electrode material layer may further include a conductive agent such as conductive carbon black.

A thickness of the electrode material layer is from 5 μm to 150 and further, the thickness of the electrode material layer is from 20 μm to 50 μm.

According to the battery electrode provided in this embodiment of the present application, the graphene that has a magnetic response function is used as a heat dissipation conductor, and the graphene is arranged in order under guidance of the applied magnetic field to form a heat conduction framework in the electrode material layer such that a maximum amount of directional heat is conducted, and heat is transmitted from the inside of the electrochemical cell to the current collector. According to the battery electrode provided in this embodiment of the present application, the heat conduction modification layer is further disposed on the surface of the current collector to form a heat conduction framework of the current collector such that the heat conduction framework of the current collector is integrated with the heat conduction framework of the graphene to enable heat to be conducted from the current collector to a periphery of the battery such that a fast heat dissipation channel from the inside of the electrochemical cell material to the periphery of the battery is constructed, and high-temperature performance of the battery is improved. In addition, the magnetic graphene that is arranged and that is introduced into the electrode material layer can reduce internal resistance of the battery, reduce heat generation, improve a rate of the battery, and ensure capacity performance of the battery.

Correspondingly, an embodiment of the present application further provides a method for producing a battery electrode, including the following steps.

(1) Provide a current collector, and produce a heat conduction modification layer on the current collector using a physical coating method, a chemical vapor deposition technique, an evaporation deposition method, or a sputtering method.

(2) Fetch graphene of a sheet-like structure, and produce, using a microwave synthesis method, a hydrothermal method, a magnetron sputtering method, an evaporation deposition method, or a chemical vapor deposition technique, graphene whose surface is modified with magnetic response nanodots.

(3) Mix the graphene whose surface is modified with the magnetic response nanodots with an electrode active material and a bonding agent, to obtain slurry, evenly coat the slurry on a surface of the heat conduction modification layer under an action of an applied magnetic field, and dry the slurry under an action of the magnetic field such that the graphene is arranged to obtain an electrode material layer, to be specific, obtain a battery electrode, where in the graphene in the electrode material layer, more than 50% of the graphene is arranged at an angle of 45° to 90° with respect to a surface, of the current collector, on which the electrode material layer is disposed, to form a heat conduction path having a specific orientation.

In step (1), the current collector includes but is not limited to metal foil or alloy foil, the metal foil includes copper, titanium, aluminum, platinum, iridium, ruthenium, nickel, tungsten, tantalum, gold, or silver foil, and the alloy foil includes stainless steel, or an alloy including at least one of the following elements copper, titanium, aluminum, platinum, iridium, ruthenium, nickel, tungsten, tantalum, gold, and silver. Optionally, in the alloy foil, the foregoing elements are main components. The metal foil may further include a doping element, and the doping element includes but is not limited to one or more of platinum, ruthenium, iron, cobalt, gold, copper, zinc, aluminum, magnesium, palladium, rhodium, silver, and tungsten.

The heat conduction modification layer may be produced using a physical coating method, a chemical vapor deposition technique, an evaporation deposition method, or a sputtering method. A material of the heat conduction modification layer may be a carbon material, and the carbon material may include one or more of carbon black, acetylene black, crystalline graphene, reduced graphene, and graphene including a doping element. The doping element includes one or more of nitrogen, phosphorus, sulfur, boron, fluorine, and chlorine.

A thickness of the heat conduction modification layer is from 0.5 nm to 500 nm. Further, the thickness of the heat conduction modification layer is from 10 nm to 300 nm.

Optionally, a secondary structure may be disposed on the surface of the current collector in advance, and then the heat conduction modification layer is disposed such that a material of the heat conduction modification layer is partially deposited on a surface of the secondary structure. The secondary structure may be a vertical array protrusion, such as a linear protrusion or a column protrusion. A material of the secondary structure may be an oxide of a current collector substrate, for example, a secondary structure of a copper oxide material disposed on a surface of a copper foil current collector. A height of the protrusion may be from 1% to 50% of a thickness of the current collector, and further, may be from 10% to 30% or from 20% to 40% of the thickness of the current collector.

In a specific implementation of the present application, a copper foil current collector is used as an example, and a method for producing a heat conduction modification layer of graphene on a surface of the copper foil current collector includes the following steps.

Step (i): Fetch a clean copper foil current collector, dry the copper foil current collector, place the copper foil current collector in a mixed atmosphere of $O_2/N_2$, and perform micro-oxidation processing at 150 Celsius (° C.) to 300° C. such that a nanometer cupric oxide (CuO) linear array is spontaneously generated on a surface of the copper foil.

Step (ii): Use, as a template, the copper foil current collector whose surface has a nanometer CuO linear array and that is obtained in step (i), continuously heat the copper foil current collector to 600° C. to 900° C. under protection of inert atmosphere, and introduce a carbon source such that carbon source molecule is evenly plated on a surface of the array under catalysis of the CuO nanometer array, thereby growing graphene, to obtain a heat conduction modification layer of the graphene.

In step (i), a method for forming a secondary structure such as a nanometer array on a surface of the current collector includes but is not limited to a micro-oxidation method, a chemical etching method, a photoetching method, a molecular beam epitaxy method, and a laser melting method.

In step (ii), a method for producing a heat conduction modification layer of graphene on a surface of the current collector includes but is not limited to a vapor deposition technique, a physical coating method, an evaporation deposition method, and a magnetron sputtering method. The carbon source may be a vapor carbon source airflow such as methane, ethane, propane, butane, ethylene, or propylene, or may be a vapor carbon source molecule carried by an inert gas partial pressure, for example, a benzene solution, an acetonitrile solution, or a styrene solution. An inert gas may be helium (He), nitrogen ($N_2$), xenon (Xe), argon (Ar), krypton (Kr), or the like, and a velocity of a mixed gas is from 5 milliliters per minute (mL/min) to 300 mL/min.

In step (ii), the process of growing graphene through plating includes two heating intervals. Generally, in a first interval, the copper foil current collector is heated to 300° C. to 500° C. such that impurities that may be included in the current collector are removed or an impure phase is converted into a pure phase, and optionally, the copper foil current collector is heated to 450° C. In a second interval, the copper foil current collector is continuously heated to 600° C. to 1000° C., a reaction carbon source is introduced, the graphene is catalytically grown on the surface of the current collector, and optionally, the copper foil current collector is continuously heated to 600° C. to 800° C.

In step (2), the magnetic response nanodot includes one or more of an oxide, an alloy, and a composite material including a magnetic element, and the magnetic element includes at least one of iron, cobalt, and nickel. In an implementation of the present application, the magnetic response nanodot further includes another doping element, and the doping element includes one or more of platinum, ruthenium, iron, cobalt, gold, copper, zinc, aluminum, magnesium, palladium, rhodium, silver, and tungsten. Optionally, a particle size of the magnetic response nanodot is less than or equal to 50 nm. Further, the particle size of the magnetic response nanodot is from 5 nm to 20 nm.

A method for producing, using a microwave synthesis method, graphene whose surface is modified with magnetic response nanodots includes fetching a graphene oxide solution, adding a magnetic response nanodot precursor material to the solution to obtain a mixed solution, and putting the mixed solution in a microwave reactor, where the mixed solution is heated to 150° C. within 1 to 5 minutes and reacts for 30 minutes, to obtain a graphene dispersion solution whose surface is modified with magnetic response nanodots, to be specific, obtain graphene whose surface is modified with magnetic response nanodots. A microwave frequency is 2450 megahertz (MHz), a power is from 400 watts (W) to 2000 W, a heating velocity is from 10° C./min to 30° C./min, a reaction temperature is from 120° C. to 200° C., and a reaction time is from 5 minutes to 30 minutes.

A method for producing, using a chemical vapor deposition technique, graphene whose surface is modified with magnetic response nanodots includes putting a specific amount of graphene powder in a ceramic crucible, placing the ceramic crucible in a tube furnace, where the graphene powder is heated to 230° C. to 280° C. under protection of argon (where an airflow is from 200 standard cubic centimeters per minute (sccm) to 300 sccm), and inputting a magnetic response nanodot precursor material (for example, iron triethoxyphosphine hydride ($H_2Fe[P(OCH_2)_3]_4$), and iron trimethylphosphine hydride ($H_2Fe[P(CH_3)_3]_4$)) to the tube furnace (where an airflow is 400 sccm) using a bubbling method, where the graphene powder reacts for 5 minutes to 30 minutes to obtain graphene whose surface is modified with magnetic response nanodots (magnetite ($Fe_3O_4$)).

A method for producing, using an evaporation deposition method, graphene whose surface is modified with magnetic response nanodots includes the following steps. A. Coat graphene powder on a silicon sheet as a plated object, perform rough pumping on an evaporator chamber for 10 minutes, perform fine pumping on the evaporator chamber for 10 minutes when a vacuum degree reaches 0.2 Torr, and when the vacuum degree reaches $2\times10^{-5}$ Torr, add argon to the evaporator chamber, and apply a bias voltage of approximately 10 kilovolts (kV) such that argon ions are generated from the argon, and a discharge effect is formed on a surface of an iron oxide substrate, to clear impurities on a surface of an iron oxide. B. When the iron oxide substrate is heated for 20 minutes to 600° C. to 800° C., stop heating after the temperature is kept for 20 minutes, when the temperature of the substrate falls to 400° C. to 420° C., heat a raw material of the iron oxide at a high current of 240 amperes (A) to 330 A to obtain molecules through gasification, and rotate the substrate, after 5 minutes, move the ferrite molecules to a substrate of the graphene powder in a vacuum state to form graphene whose surface is modified with magnetic response nanodots ($Fe_3O_4$).

A method for producing, using a hydrothermal method, graphene whose surface is modified with magnetic response nanodots includes fetching a 60 mL graphene oxide solution (1 milligram (mg)/mL), dropping a 0.01 moles per liter (mol/L) ferric nitrate ($Fe(NO_3)_3$) solution of 5 mL and 0.1 mol/L ammonia water of 1 mL in the 60 mL graphene oxide solution, putting the mixed solution in a 100 mL reactor after stirring for 10 minutes at a room temperature, where the mixed solution reacts for 30 minutes to 120 minutes at 120° C. to 180° C., to obtain a graphene dispersion solution whose surface is modified with magnetic response nanodots, and washing and drying the graphene dispersion solution to obtain graphene whose surface is modified with magnetic response nanodots.

In step (3), the electrode active material may be a positive electrode active material or a negative electrode active material. The electrode active material may be a material that can implement energy storage by deionizing ions, including but not limited to a metal, an inorganic non-metal, an oxide, a nitride, a boride, a sulfide, a chloride, or a composite material of a plurality of energy storage materials. In an embodiment, the electrode active material may be lithium, magnesium, potassium, magnesium, sulfur, phosphorus, silicon, a lithium cobalt oxide, lithium iron phosphate, a layered gradient compound, $Li_2CO_3$, $Li_4SiO_4$, LiF, $Li_3PO_3$, $TiO_2$, $Li_2TiO_3$, $Li_4Ti_5O_{12}$, $SiO_2$, $SnO_2$, NiS, CuS, FeS, MnS, $Ag_2S$, or $TiS_2$.

The bonding agent may PVDF, PVA, PTFE, CMC, SBR, sodium alginate, or the like. A solvent in the slurry may be N-methylpyrrolidone (NMP) or water.

In the coating and drying process, the applied magnetic field is applied to the current collector, and a direction of the applied magnetic field is perpendicular to the surface, of the current collector, on which the electrode material layer is disposed such that the graphene that is suspended in the slurry and whose surface is modified with the magnetic response nanodots tends to be arranged in a direction the same as that of the applied magnetic field. The magnetic response nanodot has ferromagnetism. The applied magnetic field may be applied to a position, for example, below or above the current collector.

Under the action of the applied magnetic field, the graphene in the slurry is arranged on the current collector, and the graphene and a heat conduction modification layer material on the surface of the current collector form an interconnected three-dimensional network through π-π interaction. An orderly heat conduction path of graphene inside an electrochemical cell material is interconnected to a heat conduction path of the heat conduction modification layer of the current collector to construct an integrated overall heat conduction framework from the inside of the electrochemical cell material to an electrode housing.

The method for producing a battery electrode provided in the embodiments of the present application has a simple process, and is suitable for mass production.

Correspondingly, an embodiment of the present application further provides a battery, and the battery includes the battery electrode in the foregoing embodiments of the present application. The battery electrode may be a positive electrode or a negative electrode. The battery may be a metal lithium battery, a lithium-ion battery, a sodium-ion battery, a magnesium-ion battery, an aluminum-ion battery, an air battery, or a fuel cell.

Solutions in the embodiments of the present application are further described below using a plurality of embodiments.

Embodiment 1

A method for producing a battery electrode includes the following steps.

(1) Construct a copper current collector whose surface has graphene plating by soaking copper foil (which is 99.9% pure) in a 1 mol/L hydrochloric acid solution for 10 minutes to remove surface impurities, repeatedly washing the copper foil using clear water and drying the copper foil, putting the copper foil in an $N_2$ protective atmosphere, where the copper foil is heated to 600° C. within 30 minutes, and inputting 5% (a volume fraction of oxygen in an entire intake airflow) trace oxygen to perform micro-oxidation processing for 1 hour, to form a three-dimensional current collector whose surface is grown with a CuO nanowire array. Then, the atmosphere is adjusted to hydrogen ($H_2$)/Ar, the copper foil is heated to 700° C., and a 3% (where 3% is a volume fraction of methane in total gas) methane/Ar mixed gas is introduced. After the copper foil reacts for 1 hour, the temperature naturally falls to a room temperature, to obtain the copper current collector whose surface has the graphene plating. The graphene plating is partially covered on a surface of the current collector and partially covered on a surface of the CuO nanowire array.

(2) Produce graphene whose surface is modified with magnetic response nanodots by adding 1 mL precursor ferric carbonyl (where an analytical reagent is 99%) to a 50 mL graphene oxide solution (1 mg/mL), and then putting the solution in a microwave reactor, where the solution is rapidly heated to 150° C. within 5 minutes, and reacts for 30 minutes to form a graphene sheet dispersion solution whose surface is modified with magnetic response nanodots ($Fe_3O_4$).

(3) Produce a negative electrode active material layer by repeatedly washing and centrifugalizing the graphene sheet dispersion solution whose surface is modified with the magnetic response nanodot, re-dispersing the graphene sheet dispersion solution, a bonding agent PVDF, and silicon carbon powder in an NMP solvent in a mass ratio of 1:1:8 to produce electrode slurry, fetching the copper current collector whose surface has the graphene plating, and evenly coating the electrode slurry on a surface of the graphene plating. In the coating process, a 500 millitesla (mT) neodymium magnet is disposed 1 centimeter to 3 centimeters below the current collector, and a magnetic field direction is adjusted such that graphene that has a magnetic induction characteristic in the electrode slurry is vertically aligned on the current collector under a magnetic field force, and then an electrode plate is dried in a magnetic field. In this process, the graphene in the slurry and the graphene plating on the current collector form an interconnected three-dimensional graphene network through π-π interaction, to obtain a negative electrode material layer, to be specific, obtain a negative electrode plate of a battery. More than 50% of the graphene in the negative electrode material layer is arranged at an angle of 45° to 90° with respect to the surface of the current collector to form a heat conduction path having a specific orientation.

Figure 2:
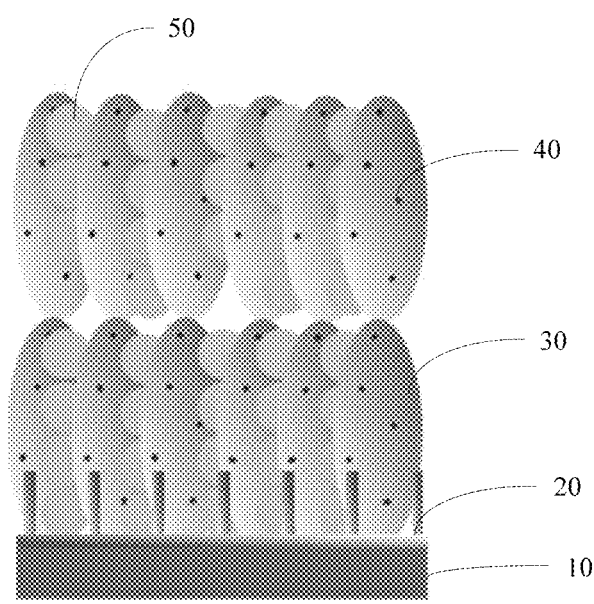
FIG. 2 is a schematic structural diagram of a battery electrode according to Embodiment 1 of the present application.
Figure 3:
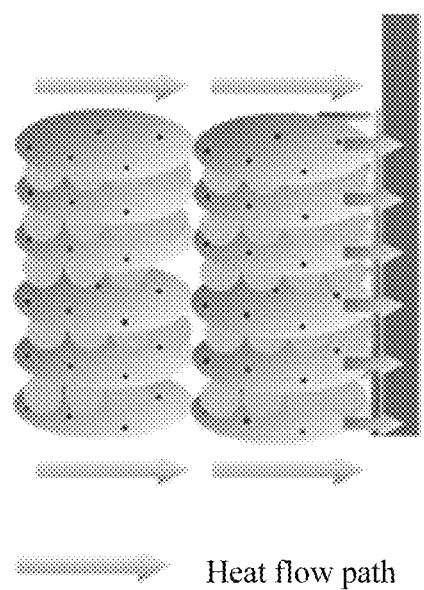
FIG. 3 is a schematic diagram of heat flow of a battery electrode according to Embodiment 1 of the present application.
Figure 4:
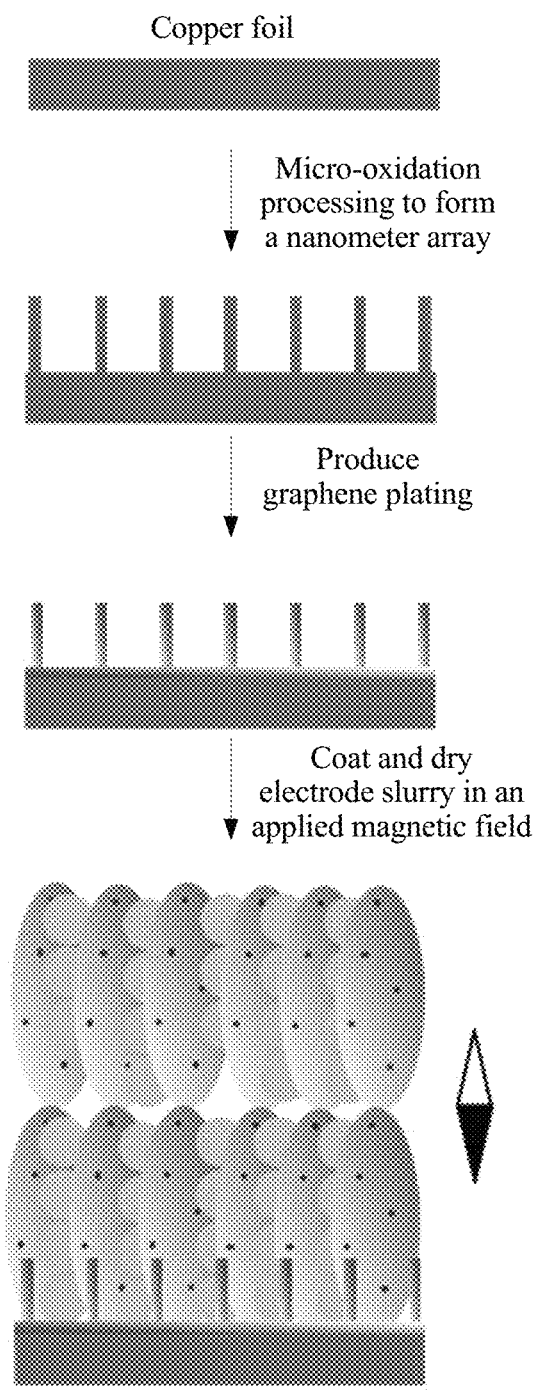
FIG. 4 is a schematic flowchart of producing a battery electrode according to Embodiment 1 of the present application.

FIG. 2 is a schematic structural diagram of a battery electrode according to Embodiment 1 of the present application. In the figure, 10 indicates a current collector, 20 indicates graphene plating (a heat conduction modification layer), 30 indicates arranged graphene, 40 indicates a magnetic response nanodot $Fe_3O_4$, and 50 indicates an electrode active material (silicon carbon powder). FIG. 3 is a schematic diagram of heat flow of a battery electrode according to an embodiment of the present application. FIG. 4 is a schematic flowchart of producing a battery electrode according to an embodiment of the present application.

A lithium-ion battery is produced as follows.

Commercial lithium cobalt oxide powder, a bonding agent PTFE, and conductive carbon black are fetched and dispersed in an NMP solvent in a mass ratio of 1:1:8 to obtain mixed slurry. The mixed slurry is coated on a surface of an aluminum foil current collector, and drying, compacting, and slicing are performed to obtain a lithium cobalt oxide positive electrode plate. The negative electrode plate of the battery obtained in Embodiment 1 of the present application is used as a negative electrode of the lithium-ion battery, an electrolyte is 1 mol/L lithium hexafluorophosphate ($LiPF_6$)/ethylene carbonate (EC)+propylene carbonate (PC)+diethyl carbonate (DEC)+ethyl methyl carbonate (EMC) (where a volume ratio is 1:0.3:1:1), a separator is a polypropylene (PP)/polyethylene (PE)/PP three-layer separator, and a soft pack battery whose capacity is approximately 4 ampere hours (Ah) is manufactured for full battery performance test.

Embodiment 2

A method for producing a battery electrode includes the following steps.

(1) Construct an aluminum-magnesium alloy current collector whose surface has graphene plating by first soaking the aluminum-magnesium alloy current collector in a 0.1 mol/L hydrochloric acid solution for 5 minutes to remove impurities on a surface of the current collector, and repeatedly washing the current collector using clear water and drying the current collector. Then, the aluminum-magnesium alloy current collector is put in an $H_2$/Ar mixed atmosphere, a temperature of the current collector raises from a room temperature to 450° C. at a velocity of 10° C./min, and the temperature is kept for 1 hour to remove impurity salt that may remain in the current collector. Then, the current collector is continuously heated to 700° C. at a velocity of 3° C./min, and a 3% acetonitrile/Ar mixed gas is introduced. After the current collector reacts for 1 hour, the temperature naturally falls to the room temperature to obtain the aluminum-magnesium alloy current collector whose surface has the graphene plating.

(2) Produce graphene whose surface is modified with magnetic response nanodots by adding a 2 mL magnetic response nanodot precursor material hexaamminecobalt(III) chloride ($[Co(NH_3)_6]Cl_3$) to a 100 mL graphene oxide solution (1 mg/mL), and putting the solution in a microwave reactor. After the solution is rapidly heated to 200° C. within 10 minutes, the solution reacts for 20 minutes to form a graphene sheet dispersion solution whose surface is modified with magnetic response nanodots (cobalt(II, III) oxide ($Co_3O_4$)).

(3) Produce a positive electrode active material layer repeatedly washing and centrifugalizing the graphene sheet dispersion solution whose surface is modified with the magnetic response nanodots, re-dispersing the graphene sheet dispersion solution, lithium cobalt oxide powder, and a bonding agent PVDF in an NMP solvent in a mass ratio of 1:8:1 to produce electrode slurry, fetching the aluminum-magnesium alloy current collector whose surface has the graphene plating, and evenly coating the electrode slurry on a surface of the graphene plating. In the coating process, an 800 mT neodymium magnet is disposed 4 centimeters to 8 centimeters below the current collector, and a magnetic field direction is adjusted such that graphene that has a magnetic induction characteristic in the electrode slurry is vertically aligned on the current collector under a magnetic field force, and then an electrode plate is dried in a magnetic field. In this process, the graphene that has a magnetic response in the electrode slurry and the graphene plating on the current collector form an interconnected three-dimensional graphene network through π-π interaction, to obtain a positive electrode material layer, to be specific, obtain a positive electrode plate of a battery. More than 50% of the graphene in the positive electrode material layer is arranged at an angle of 45° to 90° with respect to the current collector to form a heat conduction path having a specific orientation.

A lithium-ion battery is produced as follows.

Spherical graphene powder, a bonding agent SBR, and conductive carbon black are fetched and dispersed in water in a mass ratio of 8:1:1 to obtain mixed slurry. The mixed slurry is coated on a surface of a copper foil current collector, and drying, compacting, and slicing are performed to obtain a graphene negative electrode plate. The positive electrode plate of the battery obtained in Embodiment 2 of the present application is used as a positive electrode of the lithium-ion battery, an electrolyte is 1 mol/L $LiPF_6$/PC+EC+DEC (where a volume ratio is 1:4:5), a separator is a PP/PE/PP three-layer separator, and a soft pack battery whose capacity is approximately 4 Ah is manufactured for full battery performance test.

Embodiment 3

A method for producing a battery electrode includes the following steps.

(1) Construct a copper current collector whose surface has graphene plating by soaking copper foil (which is 99.9% pure) in a 0.5 mol/L hydrochloric acid solution for 10 minutes to remove surface impurities, repeatedly washing the copper foil using clear water and drying the copper foil, putting the copper foil in an Ar protective atmosphere, where the copper foil is heated to 500° C. within 30 minutes, and inputting 5% trace oxygen to perform processing for 20 minutes, to form a three-dimensional current collector whose surface is grown with a CuO nanowire array. Then, the atmosphere is adjusted to $H_2$/Ar, the copper foil is heated to 850° C., and a 10% methane/Ar mixed gas is introduced. After the copper foil reacts for half an hour, the temperature naturally falls to a room temperature to obtain the copper current collector whose surface has the graphene plating.

(2) Produce, using a chemical vapor deposition technique, graphene whose surface is modified with magnetic response nanodots by putting 100 grams (g) graphene powder in a ceramic crucible, placing the ceramic crucible in a tube furnace, where the graphene powder is heated to 230° C. to 280° C. in an argon protective atmosphere (where an airflow is from 200 sccm to 300 sccm), and inputting a composite magnetic response nanodot precursor material $H_2Fe[P(OCH_2)_3]_4$ to the tube furnace (where an airflow is 400 sccm) using a bubbling method, where the graphene powder reacts for 30 minutes, to obtain graphene whose surface is modified with magnetic response nanodots ($Fe_3O_4$).

(3) Produce a negative electrode active material layer dispersing the graphene whose surface is modified with the magnetic response nanodots, conductive carbon black, a bonding agent SBR, and silicon carbon powder in water in a mass ratio of 0.5:0.5:1:8 to produce electrode slurry, fetching the copper current collector whose surface has the graphene plating, and evenly coating the electrode slurry on a surface of the graphene plating. In the coating process, a 700 mT neodymium magnet is disposed 5 centimeters below the current collector, and a magnetic field direction is adjusted such that graphene that has a magnetic induction characteristic in the electrode slurry is vertically aligned on the current collector under a magnetic field force, and then an electrode plate is dried in a magnetic field. In this process, the graphene in the slurry and the graphene plating on the current collector form an interconnected three-dimensional graphene network through π-π interaction, to obtain a negative electrode material layer, to be specific, obtain a negative electrode plate of a battery. More than 50% of the graphene in the negative electrode material layer is arranged at an angle of 45° to 90° with respect to the current collector, to form a heat conduction path having a specific orientation.

A lithium-ion battery is produced as follows.

Commercial lithium cobalt oxide powder, a bonding agent PTFE, and conductive carbon black are fetched and dispersed in an NMP solvent in a mass ratio of 811, to obtain mixed slurry. The mixed slurry is coated on a surface of an aluminum foil, and drying, compacting, and slicing are performed to obtain a lithium cobalt oxide positive electrode plate. The negative electrode plate of the battery obtained in Embodiment 3 of the present application is used as a negative electrode of the lithium-ion battery, an electrolyte is 1 mol/L $LiPF_6$/EC+PC+DEC+EMC (where a volume ratio is 1:0.3:1:1), a separator is a PP/PE/PP three-layer separator, and a soft pack battery whose capacity is approximately 3.5 Ah is manufactured for full battery performance test.

Embodiment 4

A method for producing a battery electrode includes the following steps.

(1) Construct an aluminum-magnesium alloy current collector whose surface has graphene plating by first soaking the aluminum-magnesium alloy current collector in a 0.1 mol/L hydrochloric acid solution for 5 minutes to remove impurities on a surface of the current collector, and repeatedly washing the current collector using clear water and drying the current collector. Then, the aluminum-magnesium alloy current collector is put in an $H_2$/Ar mixed atmosphere, a temperature of the current collector raises from a room temperature to 500° C. at a velocity of 5° C./min, and the temperature is kept for 1 hour to remove impurity salt that may remain in the current collector. Then, the current collector is continuously heated to 650° C. at a velocity of 3° C./min, and a 3% toluene/Ar mixed gas is introduced. After the current collector reacts for 1 hour, the temperature naturally falls to the room temperature to obtain the aluminum-magnesium alloy current collector whose surface has the graphene plating.

(2) Produce, using a hydrothermal method, graphene whose surface is modified with magnetic response nanodots fetching a 60 mL graphene oxide solution (1 mg/mL), dropping a 0.01 mol/L $Fe(NO_3)_3$ solution of 5 mL and 0.1 mol/L ammonia water of 1 mL in the 60 mL graphene oxide solution, after stirring for 10 minutes at a room temperature, putting the mixed solution in a 100 mL reactor, where the mixed solution reacts for 30 minutes to 120 minutes at 120° C. to 180° C., to obtain a graphene dispersion solution whose surface is modified with magnetic response nanodots, and washing and drying the graphene dispersion solution to obtain graphene whose surface is modified with magnetic response nanodots.

(3) Produce a positive electrode active material layer repeatedly washing and centrifugalizing the graphene whose surface is modified with the magnetic response nanodots, re-dispersing the graphene and a $LiNi_{0.5}Mn_{0.3}Co_{0.2}O_2$ (NMC532) positive electrode material in an NMP solvent (where a mass ratio of the graphene, a bonding agent PVDF, and the NMC532 positive electrode material is 1:1:8 wt %) to produce electrode slurry, fetching the aluminum-magnesium alloy current collector whose surface has the graphene plating, and evenly coating the electrode slurry on a surface of the graphene plating. In the coating process, an 800 mT neodymium magnet is disposed 3 centimeters to 5 centimeters below the current collector, and a magnetic field direction is adjusted such that graphene that has a magnetic induction characteristic in the electrode slurry is vertically aligned on the current collector under a magnetic field force, and then an electrode plate is dried in a magnetic field. In this process, the graphene that has a magnetic response in the NMC532 positive electrode material slurry and the graphene plating on the current collector form an interconnected three-dimensional graphene network through π-π interaction, to obtain a positive electrode material layer, to be specific, obtain a positive electrode plate of a battery. More than 50% of the graphene in the positive electrode material layer is arranged at an angle of 45° to 90° with respect to the current collector to form a heat conduction path having a specific orientation.

A lithium-ion battery is produced as follows.

Conductive carbon black, a bonding agent SBR, and spherical graphene powder are fetched and dispersed in water in a mass ratio of 1.5:1.5:7 to obtain mixed slurry. The mixed slurry is coated on a surface of a copper foil current collector, and drying, compacting, and slicing are performed to obtain a graphene negative electrode plate. The positive electrode plate of the battery obtained in Embodiment 4 of the present application is used as a positive electrode of the lithium-ion battery, an electrolyte is 1 mol/L $LiPF_6$/PC+EC+DEC (where a volume ratio is 1:4:5), a separator is a PP/PE/PP three-layer separator, and a soft pack battery whose capacity is approximately 4 Ah is manufactured for full battery performance test.

Embodiment 5

A method for producing a battery electrode includes the following steps.

(1) Produce graphene whose surface is modified with magnetic response nanodots adding 1 mL precursor ferric carbonyl (where an analytical reagent is 99%) to a 50 mL graphene oxide solution (1 mg/mL), and then putting the solution in a microwave reactor, where the solution is rapidly heated to 150° C. within 5 minutes, and reacts for 30 minutes to form a graphene sheet dispersion solution whose surface is modified with magnetic response nanodots ($Fe_3O_4$).

(2) Produce a negative electrode active material layer repeatedly washing and centrifugalizing the graphene sheet dispersion solution whose surface is modified with the magnetic response nanodots, and re-dispersing the graphene sheet dispersion solution, a bonding agent PVDF, and silicon carbon powder in an NMP solvent in a mass ratio of 1:1:8 to produce electrode slurry, fetching a copper current collector, and evenly coating the electrode slurry on a surface of the current collector. In the coating process, a 500 mT neodymium magnet is disposed 1 centimeter to 3 centimeters below the current collector, and a magnetic field direction is adjusted such that graphene that has a magnetic induction characteristic in the electrode slurry is vertically aligned on the current collector under a magnetic field force, and then an electrode plate is dried in a magnetic field to obtain a negative electrode material layer, to be specific, obtain a negative electrode plate of a battery. More than 50% of the graphene in the negative electrode material layer is arranged at an angle of 45° to 90° with respect to the current collector, to form a heat conduction path having a specific orientation.

A lithium-ion battery is produced as follows.

Commercial lithium cobalt oxide powder, a bonding agent PTFE, and conductive carbon black are fetched and dispersed in an NMP solvent in a mass ratio of 1:1:8 to obtain mixed slurry. Then the mixed slurry is coated on a surface of an aluminum foil, and drying, compacting, and slicing are performed to obtain a lithium cobalt oxide positive electrode plate. The negative electrode plate of the battery obtained in Embodiment 5 of the present application is used as a negative electrode of the lithium-ion battery, an electrolyte is 1 mol/L $LiPF_6$/EC+PC+DEC+EMC (where a volume ratio is 1:0.3:1:1), a separator is a PP/PE/PP three-layer separator, and a soft pack battery whose capacity is approximately 4 Ah is manufactured for full battery performance test.

Embodiment 6

A method for producing a battery electrode includes the following steps.

(1) Construct a copper current collector whose surface has acetylene black plating by first soaking the copper current collector whose surface has a columnar protrusion array in a 0.05 mol/L hydrochloric acid solution for 20 minutes to remove impurities on a surface of the current collector, and repeatedly washing the current collector using clear water and drying the current collector. Then, the current collector is put in an $H_2$/Ar mixed atmosphere, and a temperature of the current collector raises from a room temperature to 350° C. at a velocity of 5° C./min, and the temperature is kept for 2 hours to remove impurity salt that may remain in the current collector. Then, the current collector is continuously heated to 800° C. at a velocity of 5° C./min, and a 5% acetylene/Ar mixed gas is introduced. After the current collector reacts for 1.5 hours, the temperature naturally falls to the room temperature to obtain the copper current collector whose surface has the acetylene black plating.

(2) Produce, using a hydrothermal method, graphene whose surface is modified with magnetic response nanodots by fetching a 20 mL graphene oxide solution (0.5 mg/mL), dropping a 0.01 mol/L ferrous chloride and water ($FeCl_2 \cdot 4H_2O$) solution of 5 mL, a 0.01 mol/L ferric chloride and water ($FeCl_3 \cdot 6H_2O$) solution of 5 mL, and 0.01 mol/L NaOH of 5 mL in the 20 mL graphene oxide solution, after stirring for 20 minutes at a room temperature, putting the mixed solution in a 50 mL microwave reactor, where after the mixed solution is rapidly heated to 120° C. at a velocity of 30° C./min, the mixed solution reacts for 15 minutes to obtain a graphene dispersion solution whose surface is modified with magnetic response nanodots, washing and drying the graphene dispersion solution to obtain graphene whose surface is modified with magnetic response nanodots.

(3) Produce a negative electrode active material layer by dispersing the graphene whose surface is modified with the magnetic response nanodots, conductive carbon black, bonding agent sodium alginate, and silicon carbon powder in water in a mass ratio of 0.2:0.3:1:8.5 to produce electrode slurry, fetching the copper current collector whose surface has the heat conduction acetylene black plating, and evenly coating the electrode slurry on a surface of the heat conduction acetylene black plating. In the coating process, a 1000 mT neodymium magnet is disposed 5 centimeters to 8 centimeters below the current collector, and a magnetic field direction is adjusted such that graphene that has a magnetic induction characteristic in the electrode slurry is vertically aligned on the current collector under a magnetic field force, and then an electrode plate is dried in a magnetic field. In this process, the graphene in the slurry and the acetylene black plating on the current collector form an interconnected three-dimensional graphene-acetylene black network through π-π interaction, to obtain a negative electrode material layer, to be specific, obtain a negative electrode plate of a battery. More than 50% of the graphene in the negative electrode material layer is arranged at an angle of 45° to 90° with respect to the current collector, to form a heat conduction path having a specific orientation.

A lithium-ion battery is produced as follows.

Commercial $LiNi_{0.8}Co_{0.15}Al_{0.05}O_2$ (ternary NCA) powder, a bonding agent PTFE, and conductive carbon black are fetched and dispersed in an NMP solvent in a mass ratio of 8:1:1 to obtain mixed slurry. The mixed slurry is coated on a surface of an aluminum foil, and drying, compacting, and slicing are performed to obtain a ternary NCA positive electrode plate. The negative electrode plate of the battery obtained in Embodiment 6 of the present application is used as a negative electrode of the lithium-ion battery, an electrolyte is 1 mol/L $LiPF_6$/EC+PC+DEC+EMC (where a volume ratio is 1:0.3:1:1), a separator is a PP/PE/PP three-layer separator, and a soft pack battery whose capacity is approximately 4 Ah is manufactured for full battery performance test.

Embodiment 7

A method for producing a battery electrode includes the following steps.

(1) Construct a titanium current collector whose surface has heat conduction aluminum plating by soaking a titanium foil current collector in a mixed solution of hydrochloric acid and nitric acid whose acid concentrations are 0.1 mol/L for 20 minutes, to remove impurities on a surface of the titanium foil, repeatedly washing the titanium foil current collector using clear water and drying the titanium foil current collector, putting the titanium foil current collector in a vacuum magnetron sputtering film plating apparatus, turning on a total power supply, a mechanical pump, a polymer pump at one time until a background vacuum degree is greater than $2.0 \times 10^{-4}$ Pa, and filling in highly pure argon, where an airflow volume is fixed at 30 mL/min and a target distance is fixed at 70 mm. Before plating, sputtering is performed on an aluminum target for 10 minutes to remove surface contaminants. In the plating process, sputtering power is kept at 70 W and a sputtering time is 1 hour to obtain the titanium foil collector whose surface has the aluminum plating.

(2) Produce, using a vapor deposition technique, graphene whose surface is modified with magnetic response nanodots by putting 500 g graphene powder in a ceramic crucible, placing the ceramic crucible in a tube furnace, where the graphene powder is heated to 200° C. in an argon protective atmosphere (where an airflow is from 100 sccm to 200 sccm), the temperature is kept for 1 hour to remove adsorbed moisture and impurity salt in the graphene powder, and then the graphene powder is continuously heated to 280° C., and inputting a composite magnetic response nanodot precursor material $H_2Fe[P(OCH_2)_3]_4$ to the tube furnace (where an airflow is 400 sccm) using a bubbling method, where the graphene powder reacts for 50 minutes to obtain graphene whose surface is modified with magnetic response nanodots ($Fe_3O_4$).

(3) Produce a positive electrode active material layer by repeatedly washing and centrifugalizing the graphene whose surface is modified with the magnetic response nanodots, re-dispersing the graphene, lithium cobalt oxide powder, and a bonding agent PVDF in an NMP solvent in a mass ratio of 1:8:1 to produce electrode slurry, fetching the aluminum current collector whose surface has the heat conduction aluminum plating, and evenly coating the electrode slurry on a surface of the heat conduction aluminum plating. In the coating process, a 700 mT to 1000 mT neodymium magnet is disposed 6 centimeters below the current collector, and a magnetic field direction is adjusted such that graphene that has a magnetic induction characteristic in the electrode slurry is vertically aligned on the current collector under a magnetic field force, and then an electrode plate is dried in a magnetic field. In this process, the graphene that has a magnetic response in the electrode slurry and the heat conduction aluminum plating on the current collector form an interconnected three-dimensional graphene-aluminum layer network through physical contact, to obtain a positive electrode material layer, to be specific, obtain a positive electrode plate of a battery. More than 50% of the graphene in the positive electrode material layer is arranged at an angle of 45° to 90° with respect to the current collector, to form a heat conduction path having a specific orientation.

A lithium-ion battery is produced as follows.

Commercial hard carbon powder, a bonding agent polyacrylic acid (PAA), and conductive acetylene black are fetched and dispersed in water in a mass ratio of 9:0.3:0.7 to obtain mixed slurry. The mixed slurry is coated on a surface of a copper foil current collector, and drying, compacting, and slicing are performed to obtain a hard carbon negative electrode plate. The positive electrode plate of the battery obtained in Embodiment 7 of the present application is used as a positive electrode of the lithium-ion battery, an electrolyte is 1 mol/L $LiPF_6$/PC+EC+DEC (where a volume ratio is 1:4:5), a separator is a PP/PE/PP three-layer separator, and a soft pack battery whose capacity is approximately 3.5 Ah is manufactured for full battery performance test.

What is claimed is:

1. A battery electrode, comprising:
    a current collector; and
    an electrode material layer disposed on the current collector, wherein the electrode material layer comprises:
        an electrode active material;
        graphene of a sheet-like structure, wherein a surface of the graphene is modified with magnetic response nanodots, and wherein more than 50% of the graphene is arranged at an angle of 45° to 90° with respect to a surface of the current collector to form a heat conduction path; and
        a heat conduction modification layer disposed on the surface of the current collector, wherein the electrode material layer is disposed on a surface of the heat conduction modification layer, wherein the heat conduction modification layer and the graphene form an interconnected heat conduction network, and wherein a thickness of the heat conduction modification layer is from 0.5 nanometers (nm) to 500 nm.

2. The battery electrode of claim 1, wherein the magnetic response nanodots are distributed at intervals on the surface of the graphene, and wherein the graphene is configured to be arranged, under an action of a magnetic field, in a same direction with respect to the surface of the current collector.

3. The battery electrode of claim 1, wherein 70% to 100% of the graphene is arranged at the angle of 45° to 90° with respect to the surface of the current collector.

4. The battery electrode of claim 1, wherein all the graphene is arranged at an angle of 80° to 90° with respect to the surface of the current collector.

5. The battery electrode of claim 1, wherein the graphene is single-layer graphene or multilayer graphene, wherein a thickness of the graphene is from 0.3 nanometers (nm) to 50 nm, and wherein a mass content of the graphene in the electrode material layer is from 0.1% to 20%.

6. The battery electrode of claim 1, wherein a material of the heat conduction modification layer comprises at least one of a carbon material or a heat conduction metal material, wherein the carbon material comprises at least one of carbon black, acetylene black, crystalline graphene, reduced graphene, or graphene comprising a doping element, and wherein the doping element comprises at least one of nitrogen, phosphorus, sulfur, boron, fluorine, or chlorine.

7. The battery electrode of claim 6, wherein the carbon material and the graphene are bonded together through π-π interaction, and wherein the graphene and the heat conduction modification layer are configured to form an interconnected three-dimensional heat conduction network.

8. The battery electrode of claim 1, wherein the current collector comprises metal foil or alloy foil, wherein the metal foil comprises copper, titanium, aluminum, platinum, iridium, ruthenium, nickel, tungsten, tantalum, gold, or silver foil, and wherein the alloy foil comprises stainless steel or an alloy comprising at least one of copper, titanium, aluminum, platinum, iridium, ruthenium, nickel, tungsten, tantalum, gold, or silver.

9. The battery electrode of claim 1, wherein a secondary structure is disposed on the surface of the current collector, and wherein a material of the heat conduction modification layer is partially deposited on a surface of the secondary structure.

10. The battery electrode of claim 9, wherein the secondary structure comprises a vertical array protrusion, and wherein a height of the vertical array protrusion is from 1% to 50% of a thickness of the current collector.

11. The battery electrode of claim 1, wherein the magnetic response nanodots comprise at least one of an oxide, an alloy, or a composite material comprising a magnetic element, wherein the magnetic element comprises at least one of iron, cobalt, or nickel, and wherein a particle size of the magnetic response nanodots is less than or equal to 50 nanometers (nm).

12. The battery electrode of claim 1, wherein the electrode active material is configured to store energy by deionizing ions, wherein a particle size of the electrode active material is from 3 nanometers (nm) to 30 micrometers (μm), and wherein a thickness of the electrode material layer is from 5 μm to 150 μm.

13. The battery electrode of claim 12, wherein the ions comprise one of a lithium ion, a sodium ion, a potassium ion, a magnesium ion, or an aluminum ion.

14. A battery electrode producing method, comprising:
   modifying a surface of graphene of a sheet-like structure with magnetic response nanodots to obtain surface-modified graphene;
   mixing the surface-modified graphene with an electrode active material and a bonding agent to obtain a slurry;
   disposing a heat conduction modification layer on a current collector, wherein a thickness of the heat conduction modification layer is from 0.5 nanometers (nm) to 500 nm;
   coating the slurry on a surface of the heat conduction modification layer under an action of an applied magnetic field, wherein the heat conduction modification layer and the graphene form an interconnected heat conduction network; and
   drying the slurry under the action of the applied magnetic field to obtain an electrode material layer, wherein the electrode material layer is a battery electrode, and wherein in the surface-modified graphene, more than 50% of the surface modified graphene is arranged at an angle of 45° to 90° with respect to a surface of the current collector to form a heat conduction path.

15. The battery electrode producing method of claim 14, wherein the applied magnetic field is applied to the current collector, wherein a direction of the applied magnetic field is perpendicular to the surface of the current collector, wherein the surface modified graphene suspended in the slurry is configured to be arranged in a same direction as the applied magnetic field, and wherein the magnetic response nanodots have ferromagnetism.

16. The battery electrode producing method of claim 14, wherein the surface-modified graphene is produced using a microwave synthesis method, a hydrothermal method, a magnetron sputtering method, an evaporation deposition method, or a chemical vapor deposition technique.

17. The battery electrode producing method of claim 14, further comprising:
   producing a heat conduction modification layer on the current collector using a physical coating method, a chemical vapor deposition technique, an evaporation deposition method, or a sputtering method;
   coating the slurry on a surface of the heat conduction modification layer; and
   drying the slurry under the action of the applied magnetic field to obtain the electrode material layer.

18. A battery, wherein the battery comprises a battery electrode, and wherein the battery electrode comprises:
   a current collector; and
   an electrode material layer disposed on the current collector, wherein the electrode material layer comprises:
      an electrode active material;
   graphene of a sheet-like structure, wherein a surface of the graphene is modified with magnetic response nanodots, and wherein more than 50% of the graphene is arranged at an angle of 45° to 90° with respect to a surface of the current collector to form a heat conduction path; and
   a heat conduction modification layer disposed on the surface of the current collector, wherein the electrode material layer is disposed on a surface of the heat conduction modification layer, wherein the heat conduction modification layer and the graphene form an interconnected heat conduction network, and wherein a thickness of the heat conduction modification layer is from 0.5 nanometers (nm) to 500 nm.

19. The battery of claim 18, wherein the battery is a metal lithium battery, a lithium-ion battery, a sodium-ion battery, a magnesium-ion battery, an aluminum-ion battery, an air battery, or a fuel cell.

20. The battery of claim 18, wherein the graphene is single-layer graphene or multilayer graphene, wherein a thickness of the graphene is from 0.3 nanometers (nm) to 50 nm, and wherein a mass content of the graphene in the electrode material layer is from 0.1% to 20%.

* * * * *